A. O. BRIGANCE.
BALE BAND BUCKLE.
APPLICATION FILED NOV. 1, 1910.
994,243.
Patented June 6, 1911.
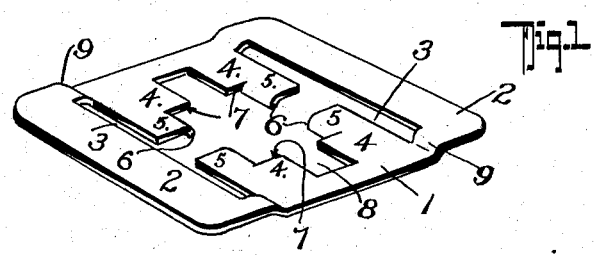
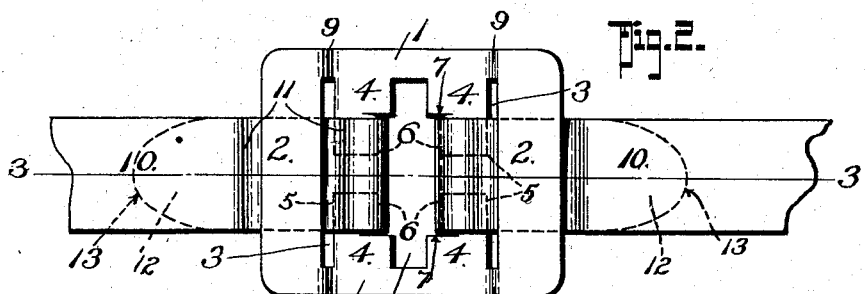
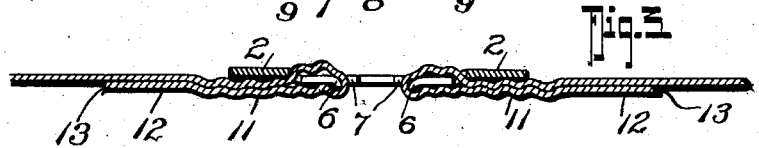
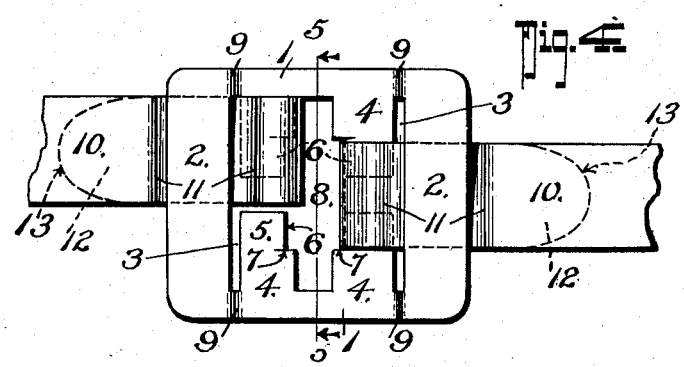
Witnesses
Charles H. Wagner.
John J. Schrott
Inventor
Alice O. Brigance
By
Fred G. Dieterich
Attorneys

UNITED STATES PATENT OFFICE.

ALICE O. BRIGANCE, OF NAVASOTA, TEXAS.

BALE-BAND BUCKLE.

994,243. Specification of Letters Patent. Patented June 6, 1911.

Application filed November 1, 1910. Serial No. 590,167.

*To all whom it may concern:*

Be it known that I, ALICE O. BRIGANCE, residing at Navasota, in the county of Grimes and State of Texas, have invented certain new and useful Improvements in Bale-Band Buckles, of which the following is a specification.

My invention relates to a new and improved buckle for use in connection with bale ties and bands, and in its generic nature the invention seeks to provide an improved form of buckle which is more particularly adapted to use in connection with the bale band that forms the subject-matter of my copending application filed on the 31st day of October, 1910, and bears Serial No. 589,945.

The buckle that forms the subject-matter of this application is an improvement on the form of buckle in my copending application filed July 16, 1910, Serial No. 572,267.

The invention in its general make-up consists of a buckle body, the ends of which are offset to lie in a plane parallel with the central part of the buckle body, the body being provided with inwardly projected lugs having reduced ends to leave shoulders and around which reduced ends the bale band is looped, the shoulders preventing endwise movement of the bale band, the lugs being spaced apart to permit of the easy removal of the bale band when desired.

In its more subordinate nature the invention includes those novel details of construction, combination and arrangement of parts, all of which will be first fully described, then be specifically pointed out in the appended claim and illustrated in the accompanying drawings, in which:

Figure 1, is a perspective view of my buckle. Fig. 2, is a top plan view of the same showing the bale band in place. Fig. 3, is a section on the line 3—3 of Fig. 2. Fig. 4, is a top plan view showing the manner of sliding the bale band to one side prior to removing the same from the buckle. Fig. 5, is a section on the line 5—5 of Fig. 4, showing how the bale band may be unhooked from the buckle.

Referring now to the accompanying drawings in which like letters and numerals of reference indicate like parts in all of the figures 1 is the body portion of the buckle which lies in one plane and has the ends 2 off-set to lie in a plane above that containing the main body part of the buckle. The buckle body is cut away to leave an inner opening into which two pairs of lugs 4—4 project, the lugs 4 projecting inwardly from the sides of the buckle and having reduced portions 5 whose edges are bent over as shown in the drawings, for a purpose presently to appear, the projections 5 terminating short of one another to leave a space between them, and the projections 5 are of less width than the width of the lugs 4 to leave stop shoulders 7 against which the bale band 10 engages to prevent its accidental removal from the buckle.

3 designates the longitudinal end slot portions through which the loop of the bale band 10 is passed.

8 designates the central opening portion of the buckle and 9 indicates where the buckle body is off-set or bent up.

The bale band 10 may be, and preferably is, of the construction shown in my copending application first above mentioned and has its ends 12 uncorrugated and terminating in a rounded portion 13 to prevent tearing of the hands of the operator, or tearing the bale. The band 10 adjacent to the uncorrugated part 12 is provided with a set of transverse corrugations 11, the extent of which is dependent upon the requirements met with in practice.

In the use of my invention, the bale band 10 is looped around the lug projections 5 and lies between the shoulders 7. When it is desired to release the band 10 from the buckle the band 10 is drawn tighter until its loop may be slipped over the lug 4 at one side of the buckle, (see Fig. 4) after which the loop can be slipped off of the lug 4, as shown in Fig. 5, of the drawing. To apply the band the reverse operation takes place.

From the foregoing description taken in connection with the accompanying drawings, it is thought the complete construction, operation and advantages of my invention will be readily understood by those skilled in the art to which the invention appertains.

What I claim is:

A bale band comprising a body portion having its ends off-set to lie in a plane parallel with the remaining part of the body portion, two sets of lugs projecting inwardly from and in the plane of the said remaining part of the body portion, said lugs terminating short of one another and having end portions of reduced width to leave shoulders, a bale band looped around said portions of reduced width to lie between said shoulders, said bale band having corrugations engaged by one edge of said reduced portions, said bale band projecting under said off-set ends of said buckle body, the inner edges of said off-set ends forming shoulders to engage the corrugations of the band.

ALICE O. BRIGANCE.

Witnesses:
C. M. SPANN,
C. P. SPANN.

Copies of this patent may be obtained for five cents each, by addressing the "Commissioner of Patents, Washington, D. C."